(12) United States Patent
Muth

(10) Patent No.: US 9,445,032 B2
(45) Date of Patent: Sep. 13, 2016

(54) AUTO-PAIRING CONTROL DEVICE

(71) Applicant: Broadcom Corporation, Irvine, CA (US)

(72) Inventor: James Michael Muth, Santa Ana, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/636,744

(22) Filed: Mar. 3, 2015

(65) Prior Publication Data

US 2015/0271432 A1   Sep. 24, 2015

Related U.S. Application Data

(60) Provisional application No. 61/969,689, filed on Mar. 24, 2014.

(51) Int. Cl.
| | |
|---|---|
| *H04N 5/44* | (2011.01) |
| *H04M 1/725* | (2006.01) |
| *H04N 21/422* | (2011.01) |
| *H04N 21/436* | (2011.01) |
| *H04W 12/08* | (2009.01) |
| *H04W 4/00* | (2009.01) |
| *H04W 76/02* | (2009.01) |
| *H04W 84/18* | (2009.01) |

(Continued)

(52) U.S. Cl.
CPC ............ *H04N 5/44* (2013.01); *H04L 12/2809* (2013.01); *H04L 63/101* (2013.01); *H04M 1/72533* (2013.01); *H04N 21/42204* (2013.01); *H04N 21/42207* (2013.01); *H04N 21/43637* (2013.01); *H04W 4/008* (2013.01); *H04W 12/08* (2013.01); *H04W 76/023* (2013.01); *H04N 21/43615* (2013.01); *H04W 84/18* (2013.01)

(58) Field of Classification Search
CPC ............ H04N 5/44; H04N 21/43637; H04N 21/42204; H04N 21/42207; H04N 21/43615; H04W 4/008; H04W 76/023; H04W 12/08; H04W 84/18; H04M 1/72533; H04L 63/101; H04L 12/2807
See application file for complete search history.

(56) References Cited

U.S. PATENT DOCUMENTS 6,912,373 B2   6/2005   Lee
8,055,197 B2 *  11/2011   Lyu .................... H04B 17/318
                                                455/41.2
(Continued)

FOREIGN PATENT DOCUMENTS

EP   1294130 A2   3/2003
EP   2355563 A1   8/2012
(Continued)

*Primary Examiner* — Brian Yenke
*Assistant Examiner* — Sean Haiem
(74) *Attorney, Agent, or Firm* — Brinks Gilson & Lione

(57) ABSTRACT

A host device, such as a television, automatically pairs with target devices, such as remote controls. There may be multiple host devices, and the host devices may exchange information that specifies valid, trusted, or authorized target devices, the signal level or range of signal levels at which the host device communicated with the target device, and other information. The host devices detect when a specific target device meets a transition criterion. Responsive to the transition criterion, a new host device automatically connects to the target device, and a prior host device that previously connected to the target device no longer responds to the target device.

20 Claims, 7 Drawing Sheets

(51) Int. Cl.
*H04L 12/28* (2006.01)
*H04L 29/06* (2006.01)
*H04N 21/4363* (2011.01)

(56) References Cited

U.S. PATENT DOCUMENTS

| | | | |
|---|---|---|---|
| 8,195,143 B2 * | 6/2012 | Erceg | H04W 36/28 340/431 |
| 8,346,938 B1 * | 1/2013 | Caddes | H04L 12/403 455/556.2 |
| 8,850,052 B2 * | 9/2014 | Rosenblatt | H04L 12/2812 709/212 |
| 2013/0157573 A1 * | 6/2013 | Aldaz | H04W 4/008 455/41.2 |
| 2014/0179234 A1 * | 6/2014 | Lee | H04W 76/023 455/41.2 |

FOREIGN PATENT DOCUMENTS

| | | |
|---|---|---|
| EP | 2536185 A2 | 12/2012 |
| WO | WO2013/181778 A1 | 6/2012 |

\* cited by examiner

AUTO-PAIRING CONTROL DEVICE

PRIORITY CLAIM

This application claims priority to provisional application Ser. No. 61/969,689, filed Mar. 24, 2014.

TECHNICAL FIELD

This disclosure relates to wireless communications between a human interface device and a receiving system.

BACKGROUND

Rapid advances in electronics and communication technologies, driven by immense customer demand, have resulted in the widespread adoption of wireless communication technologies. Many of these devices, e.g., computers, tablets, televisions, and other information appliances, have sophisticated processing capability and communication protocols with connection establishment routines. The connection establishment circuitry is often present for pairing the device with other devices, such as a remote control or another human interface device (HID). Improvements to these devices, and the device pairing, will enhance the technical capabilities of the devices and improve user experience with the devices.

DETAILED DESCRIPTION

Figure 1:
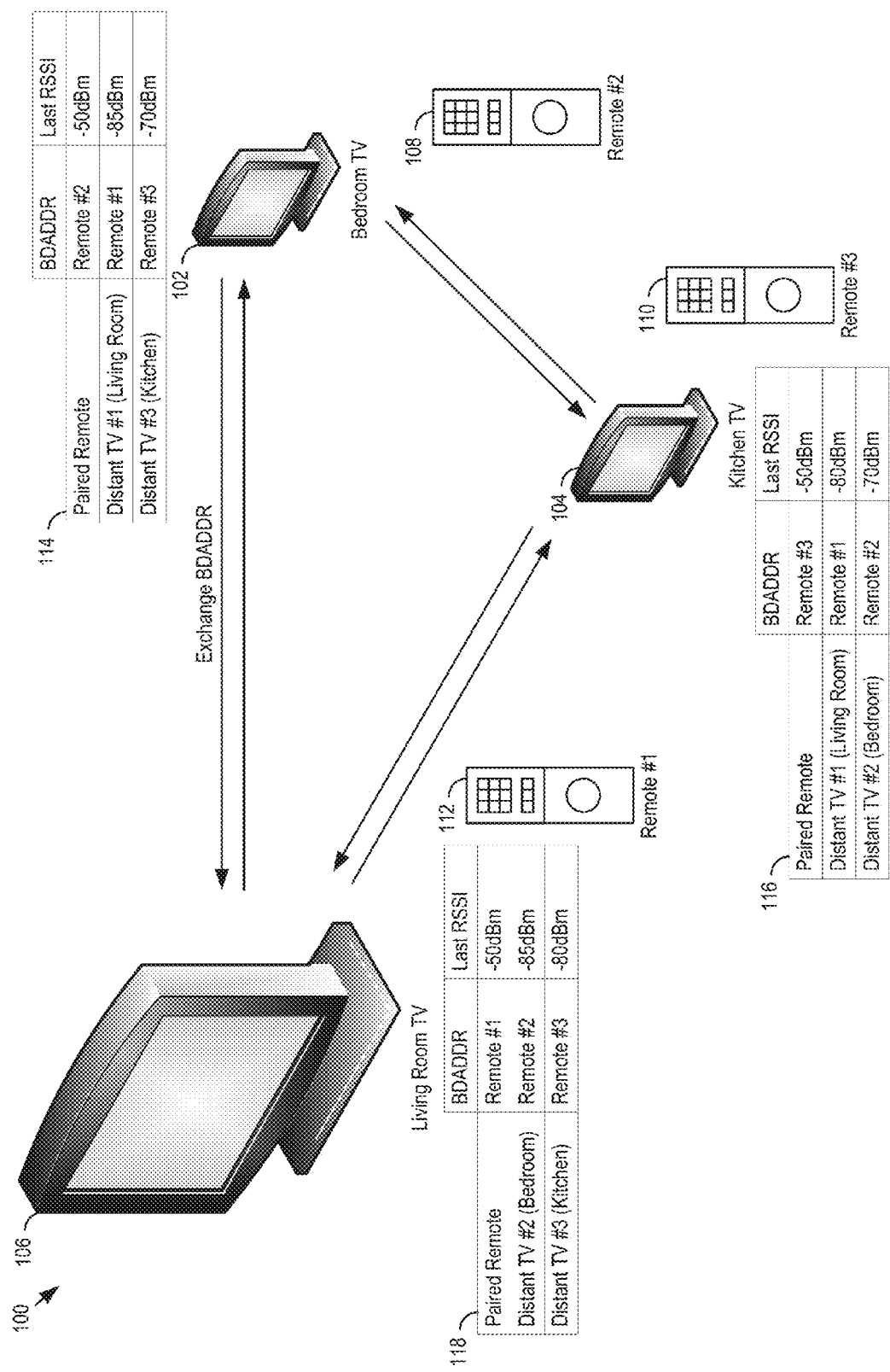
FIG. 1 shows an example environment for Bluetooth(R) (BT) remote control pairing with multiple host devices.

As an introduction to the description below, a host device, such as a television (TV), may in certain cases automatically pair with target devices, such as remote controls. The host device may be any type of device, such as any type of TV, smart phone, radio, game system, streaming audio controller (e.g., a Sonos(™) Connect or Connect Amp) or any other device. The target device may be any type of device that will establish a communication channel with the host device, including another host device (e.g., two televisions may establish a communication channel). The target device may be, for instance, a remote control for a television, game controller for a game system, or remote control for an audio-visual (AV) receiver, tuner, pre-amp, or other device. The target device and the host device may establish their communication channel, and exchange information (e.g., signal quality and target device identifiers) over any type or combination of types of wired, wireless, or optical interfaces, including Bluetooth, WiFi (e.g., any type of IEEE 801.11 protocol), Ethernet, Media over Coax Alliance (MoCA) protocol, powerline, or other communication interface.

For a specific example, the description below describes television remote controls as the target devices, and smart televisions as the host devices. The smart televisions may include, as examples, Internet browsing capability, Internet or LAN streaming for audio and video, and tuning capability for receiving television signals via cable, satellite, or local antenna. The example below uses Bluetooth (BT) pairing as one example of establishing a communication channel, but other mechanisms for establishing communication channels may substitute for BT pairing. The host devices and target devices, as noted above, are not limited to the specific examples given below, nor is there any limitation implied with the labels "host device" and "target device" used for descriptive purposes below. A target device may be a remote control, but may also be any other type of human interface device (HID). A host device that is a television may connect to a target device that is also a television, for example.

There may be multiple host devices, and the host devices may exchange information that specifies valid, trusted, or authorized target devices, the signal level or range of signal levels at which the host device last communicated with the target device, and other information. A new host devices detect when a specific target device meets a transition criterion. Responsive to the transition criterion, the new host device may automatically connect to the target device, and a prior host device that previously connected to the target device no longer responds to the target device.

As described below, an operator may operate multiple different host devices with a single target device, e.g., a single BT remote. The operator may initially manually pair the BT remote to any desired host device to be controlled. For example, an operator with multiple TVs may pair the BT remote each time the operator switches between the TVs. The system and techniques below facilitate having the remote control automatically work with multiple different host devices without requiring the operator to manually initiate a pairing operation for the remote each time the remote control switches to a different host device to control. This may happen, for instance, when the operator has carried the remote control to a different room where another host device exists, and the remote was previously paired with a host device at the previous location. For example, an operator may attempt to control a second TV in a bedroom with a remote that was carried to the bedroom from the kitchen and was previously paired with a first TV in the kitchen.

FIG. 1 shows an example environment 100 for establishing a communication channel between target devices and host devices. The communication channel may be a BT channel established as part of a BT remote pairing operation. In the example, there are multiple TVs: a bedroom TV 102, a kitchen TV 104, and a living room TV 106. There are three corresponding remotes: a bedroom remote 108, a kitchen remote 110, and a living room remote 112. The addresses and RSSI values shown in FIG. 1 are example values. Three TVs and three remotes are shown, but more, fewer, or different host and target devices of any type may participate in the information exchange.

The host devices may exchange information on paired target devices, whether the pairing happened manually or automatically. For example, recently paired remote device addresses or other identifiers (e.g., a BT address, BDADDR) and signal quality information (e.g., last received signal strength indications (RSSI), signal to noise ratio (SNR), or bit error rate (BER)) may be exchanged between host devices. The signal quality information may be specified as a range of values, e.g., between −55 dBm and −40 dBm, or as a single number, e.g., an average of −50 dBm.

Each host device may maintain a target device table of known target devices, e.g., the three remote controls 108, 110, 112. The known target devices may be target devices that successfully completed a manual or automatic pairing operation to any host device. The example in FIG. 1 shows a target device table 114 in the bedroom TV 102, a target device table 116 in the kitchen TV 104, and a target device table 118 in the living room TV 106.

The time period for the next information exchange may be randomized or scheduled so that any host device may start the exchange with reduced chance of transmission collision. In some implementations, a specific host device among multiple host devices may initiate the exchanges. Additionally or alternatively, exchanges may be triggered by events. For example, if a TV detects a power source interruption this may indicate the TV has been moved from a previous location, e.g., unplugged and moved. The TV may initiate an exchange to receive potential new remotes for the new location. With the techniques described below, a newly purchased/installed TV initiating such an exchange may work 'out of the box' with remotes already in the house.

Note that the exchanges may occur over any communication channel. For instance, WiFi, Ethernet, or cellular connected host devices may exchange target device identifiers and signal quality information in network packets, or over cellular data channels. As another example, the host devices may exchange information over a BT channel. With regard to BT technology, the host devices and target devices may exchange information use Bluetooth Low Energy (BLE), Basic Rate (BR), and Extended Data Rate (EDR) techniques.

As a more specific example of exchange over BT, the bedroom TV 102 may send a BT page to the kitchen TV 104. The kitchen TV 104 may send a page response, and a connection between the two may be established. The bedroom TV 102 may then send a target device report of the BDADDRs of its paired remotes, and the RSSIs of the last connection of those remotes. Similarly, the kitchen TV 104 may send a target device report of its paired remotes' BDADDRs and the RSSIs of the last connection of those remotes to the bedroom TV 102. A similar exchange may occur with the living room TV 106. The TVs may disconnect and set a time to exchange information again. For example, the interval between exchanges may be set randomly, may occur in response to triggering events, may be set at a pre-determined time, or in another manner. As a result of the exchange, the host devices may each obtain a list of target device identifiers and signal quality for known target devices communicating with the other host devices.

Figure 2:
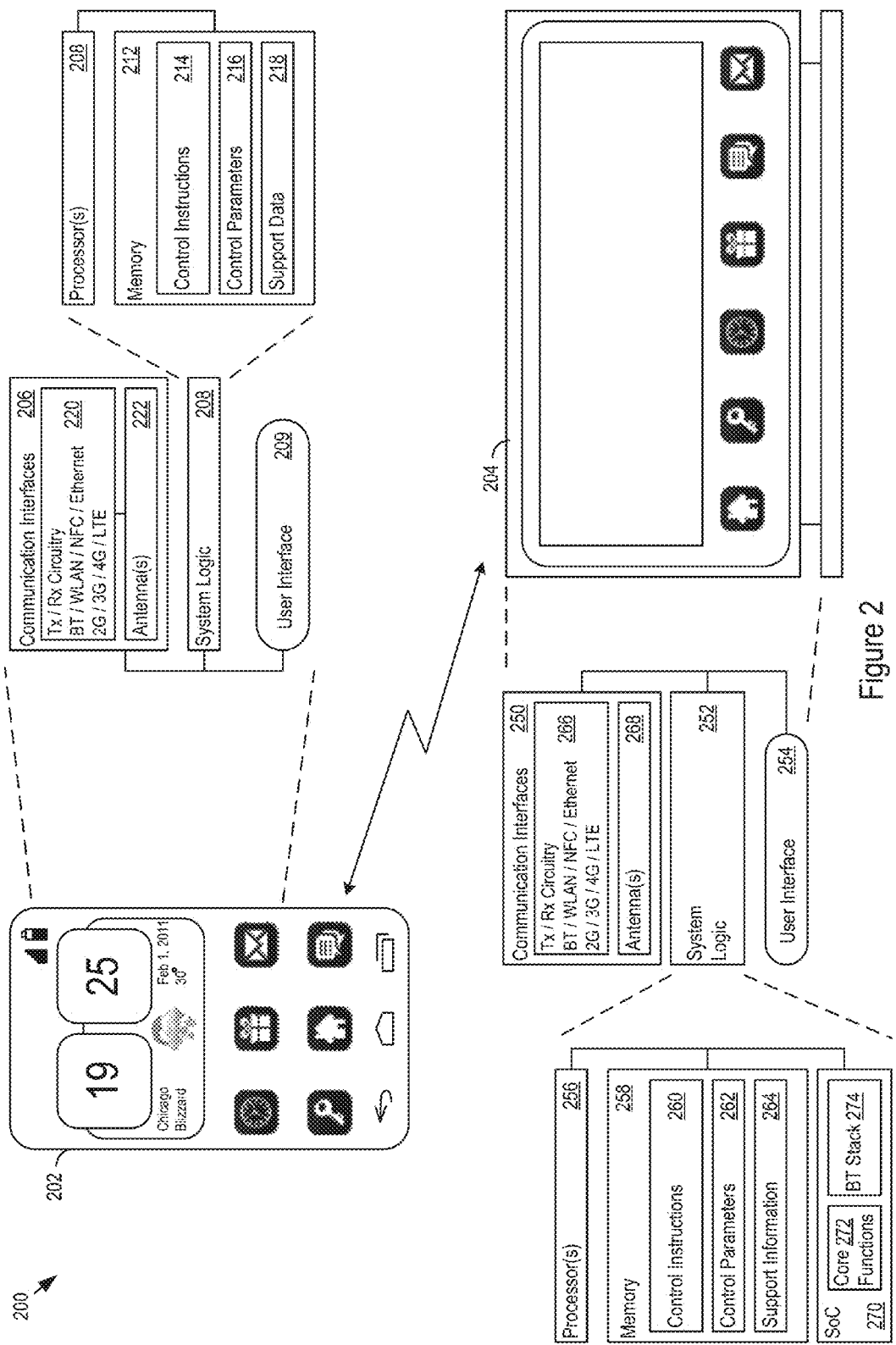
FIG. 2 shows an example environment for device-to-device interaction.

FIG. 2 shows an example environment 200 for device interaction. In this example environment 200 a target device 202, e.g., a smartphone running a remote control application, communicates with a host device 204, e.g., a TV. The techniques described above regarding address exchanges may be implemented in a wide array of different types of devices. Accordingly, the remote control and TV examples described below provides just one example context for explaining the address exchange techniques.

The target device 202 includes communication interfaces 206, system logic 208, and a user interface 209. The system logic 208 may include any combination of hardware, software, firmware, or other logic. The system logic 208 may be implemented, for example, with one or more systems on a chip (SoC), application specific integrated circuits (ASIC), discrete analog and digital circuits, and other circuitry. The system logic 208 is part of the implementation of any desired functionality in the target device 202. In that regard, the system logic 208 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, BT connections, or other connections; and displaying information on the user interface 209. The user interface 209 may include a graphical user interface, touch sensitive display, voice or facial recognition inputs, buttons, switches, speakers and other user interface elements. Additional examples of the inputs for the user interface 209 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 208 may include one or more processors 210 and memories 212. The memory 212 stores, for example, control instructions 214 that the processor 210 executes to carry out desired functionality for the target device 202. The control parameters 216 provide and specify configuration and operating options for the control instructions 214. The memory 212 may also store any BT, WiFi, 3G, or other support data 218 that the target device 202 will send, or has received, through the communication interfaces 206.

In the communication interfaces 206, Radio Frequency (RF) transmit (Tx) and receive (Rx) circuitry 220 handles transmission and reception of signals through one or more antennas 222. The communication interface 206 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline or optical) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 206 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

The host device 204 includes communication interfaces 250 system logic 252, and a user interface 254. The system logic 252 may include any combination of hardware, software, firmware, or other logic. The system logic 252 may be implemented, for example, with one or more systems on a chip (SoC), application specific integrated circuits (ASIC), discrete analog and digital circuits, and other circuitry. The system logic 252 is part of the implementation of any desired functionality in the host device 204. In that regard, the system logic 252 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, BT connections, or other connections; and displaying relevant information on the user interface 254. The user interface 254 may include a graphical user interface, touch sensitive display, voice or facial recognition inputs, buttons, switches, speakers and other user interface elements. Additional examples of the inputs for the user interface 254 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 252 may include one or more processors 256 and memories 258. The memory 258 stores, for example, control instructions 260 that the processor 256 executes to carry out desired functionality for the host device 204. The control parameters 262 provide and specify configuration and operating options for the control instructions 260. The memory 258 may also store any BT, WiFi, 3G, or other support data 264 that the host device 204 will send, or has received, through the communication interfaces 250. As specific examples, the support data 264 may include received target device identifiers and signal quality information, the target device table, or other information.

In the communication interfaces 250, Radio Frequency (RF) transmit (Tx) and receive (Rx) circuitry 266 handles transmission and reception of signals through one or more antennas 268. The communication interface 250 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 250 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

There may be additional support circuitry in the host device 204. For instance, the host device 204 may include a SoC 270 that implements any desired functionality 272. The functionality 272 may execute, for instance, when the processor 256 and memory 258 are in a reduced functionality mode, e.g., powered down, in another low power state, a suspended state, or other reduced functionality state. The functionality 272 may include waking other circuitry in the host device upon pre-selected events (e.g., a power-on button press from a remote control), and restoring the host device to an active operational mode. In particular, the SoC 270 may implement all or part of a BT stack 274 to support pre-determined types of BT communication when other circuitry is powered down or disabled. This is referred to as a "headless" operational mode.

Headless mode may include inquiry scan and Bluetooth Low Energy (BLE) scan in addition to page scans. As a result, the host device, when in a reduced functionality mode, may still pair with remote host devices and target devices, and exchange target device information.

In some implementations in headless mode, a host device may check a class of device (CoD) to make sure the device it is paring with in headless mode is another host device (e.g., another TV). The host device may also check the vendor identification (VID) to make sure the other host device is a compatible brand or model. In some cases, one more of these checks may be omitted if the class or brand of the device is not determinative of whether the target device may control the host device. That is, in some cases, establishing communication channels (e.g., through paring) may occur between devices with multiple different CoDs or VIDs. For example, a remote may be used to control a TV, set-top box, and/or a game console from the same or different manufacturers.

In some cases, an inquiry scan may occur when the host device is active. In response, a second host device may start sending a reporting message, such as a Sync Train beacon. For example, beacons may be sent at 80 ms intervals for BT 3DG systems. The sync train may contain the Bluetooth address (BDADDR) of the second host device and clock information for the second host device. Beacons, which may contain clock information, can be sent when the power is applied to the BT device and before the host device is powered up (e.g., in headless mode). The second host device may recognize the pattern of beacons, and complete the pairing with the original host device or target device.

Figure 3:
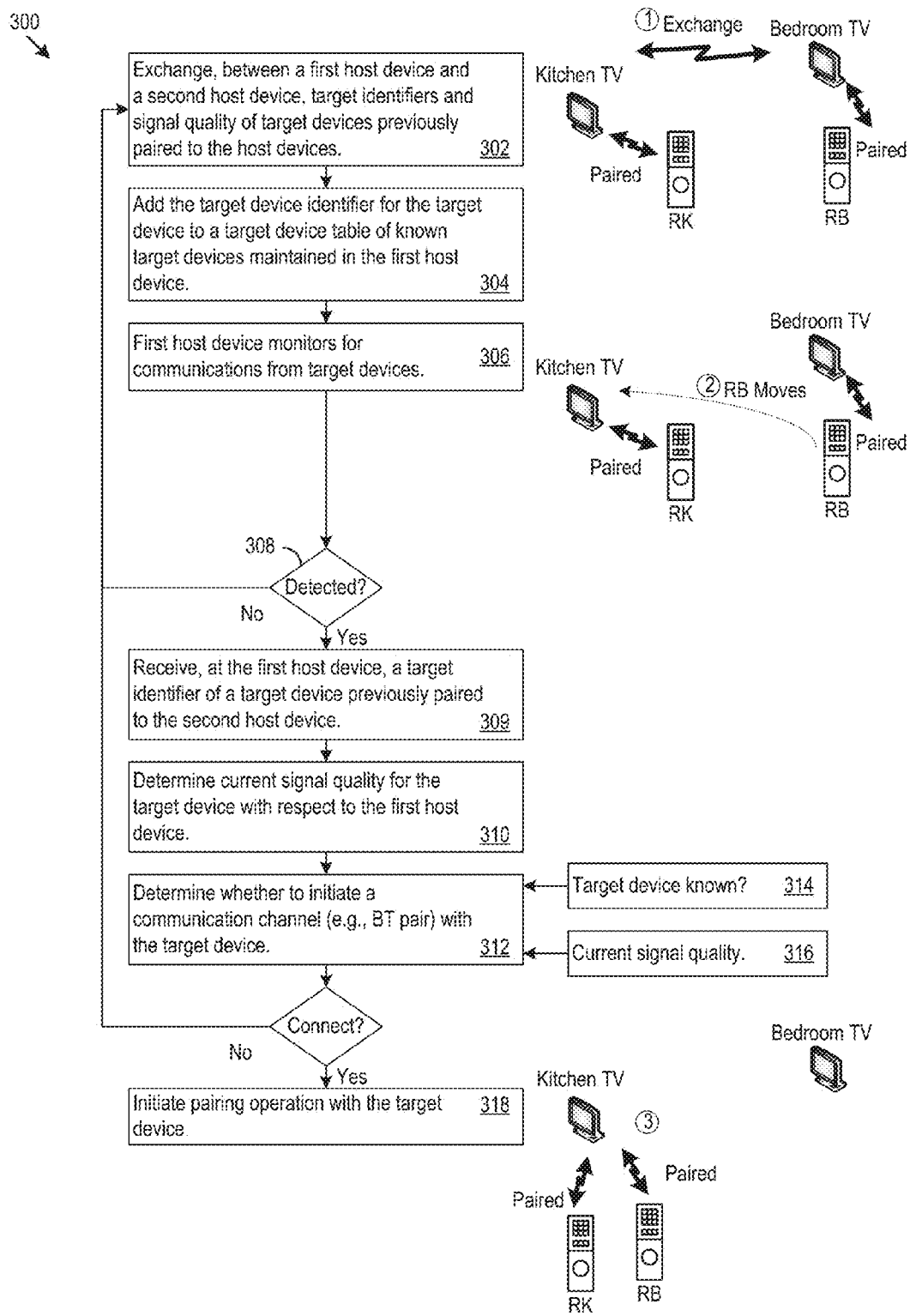
FIG. 3 shows logic for connecting a target device with a host device.

FIG. 3 shows logic 300 that a first host device may implement for connecting to a target device. As an example, FIG. 3 starts with a first host device, a kitchen TV, already paired with a kitchen remote (RK) and a second host device, a bedroom TV, already paired with a bedroom remote (RB). In this example, the bedroom remote will automatically pair with the kitchen TV when, for instance, the operator carries the bedroom remote into the kitchen.

The logic 300, as described above, may exchange, between the first and second host devices, target identifiers and signal quality of target devices previously paired to the host devices (302). Each host device may build and maintain a target device table of known target devices (304). The target devices tables may include the target identifiers, signal quality indicators, or any other data associated with the target devices.

The first host device monitors for communications from target devices (306), for instance in headless mode. For example, the kitchen TV may monitor for communications emanating from any remote control, including the bedroom remote control. When a communication signal (e.g., a BT advertisement or other BT signal) from the target device is detected at the first host device (308), the first host device may determine whether to connect to the target device, e.g., via BT pairing.

From the communication signal, the first host device may obtain or extract a target identifier of the target device responsible for the communication signal. In this example, the bedroom remote sent the communication signal, and was previously paired to the second host device, the bedroom TV (309). The first host device may also determine current signal quality for the target device with respect to the first host device (310). For instance, the first host device may determine the RSSI of the target device. The first host device may then determine whether to initiate pairing between the first host device and the target device (312).

The determination may take several factors into account. Example factors include: whether the target device is represented in the target device table of known target devices (314), and the current signal quality for the target device with respect to the first host device (316). In one implementation, when the target device is known, and the current signal quality meets a pre-determined connection threshold (e.g., the signal quality level is within a pre-determined range of the last connected target device, RK), then the specific host device may establish a communication channel with the target device. This may be done by automatically performing a BT pairing procedure with the target device (318).

The first host device may determine not to initiate pairing when the target device is not represented in the target device table of known target devices, for instance. As another example, the first host device may determine not to initiate pairing when the current signal quality fails to meet a connection criterion. As noted above, the connection criterion may be that the RSSI falls within a pre-defined range of RSSI (e.g., a range defined around the RSSI of the last connected target device RK). Other connection criterion may be implemented, such as the RSSI exceeding a minimum connection threshold.

Note that after establishing the communication channel, the first host device may exchange information about the target device with other host devices. For instance, the first host device may transmit to any other host device the current signal quality for the target device with respect to the first host device and the target device identifier. The other host devices may then maintain their target device tables with the new information.

Figure 4:
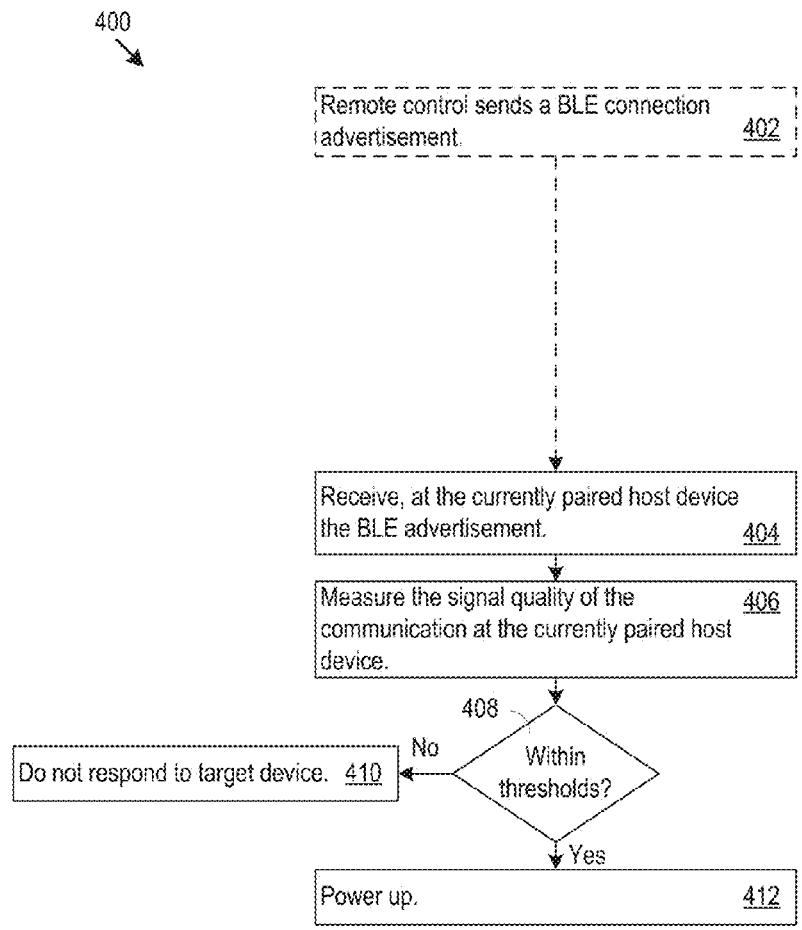
FIG. 4 shows another example of logic for connecting a target device with a host device.

FIG. 4 shows another example of logic 400 for connecting a target device with a host device. When, for instance, the operator activates a specific control or presses a specific button (e.g., the power on button) on the target device (e.g., a remote control), the remote control may send a BLE connected advertisement (402). The host device (e.g. the bedroom TV 102) that the remote control is currently paired with may receive the BLE advertisement (404) and measure the signal quality (e.g., the RSSI) of the communication (e.g., the RSSI of the signal bearing the packets) (406).

When the RSSI of the remote control is within a threshold (e.g., within an RSSI range, or above an RSSI minimum bound) of a prior, e.g., last, measurement (408), that may indicate continuing proximity to the current host device. In that case, the current host device may power up in response to the BLE advertisement and power-on request (412). Otherwise, the current host device may disregard the connected advertisement and power-on button press (410). In some implementations, the connection criteria may be set as a signal level with a determined threshold range of the last measurement, or within one or more standard deviations based on, e.g., historical signal level variation.

Figure 5:
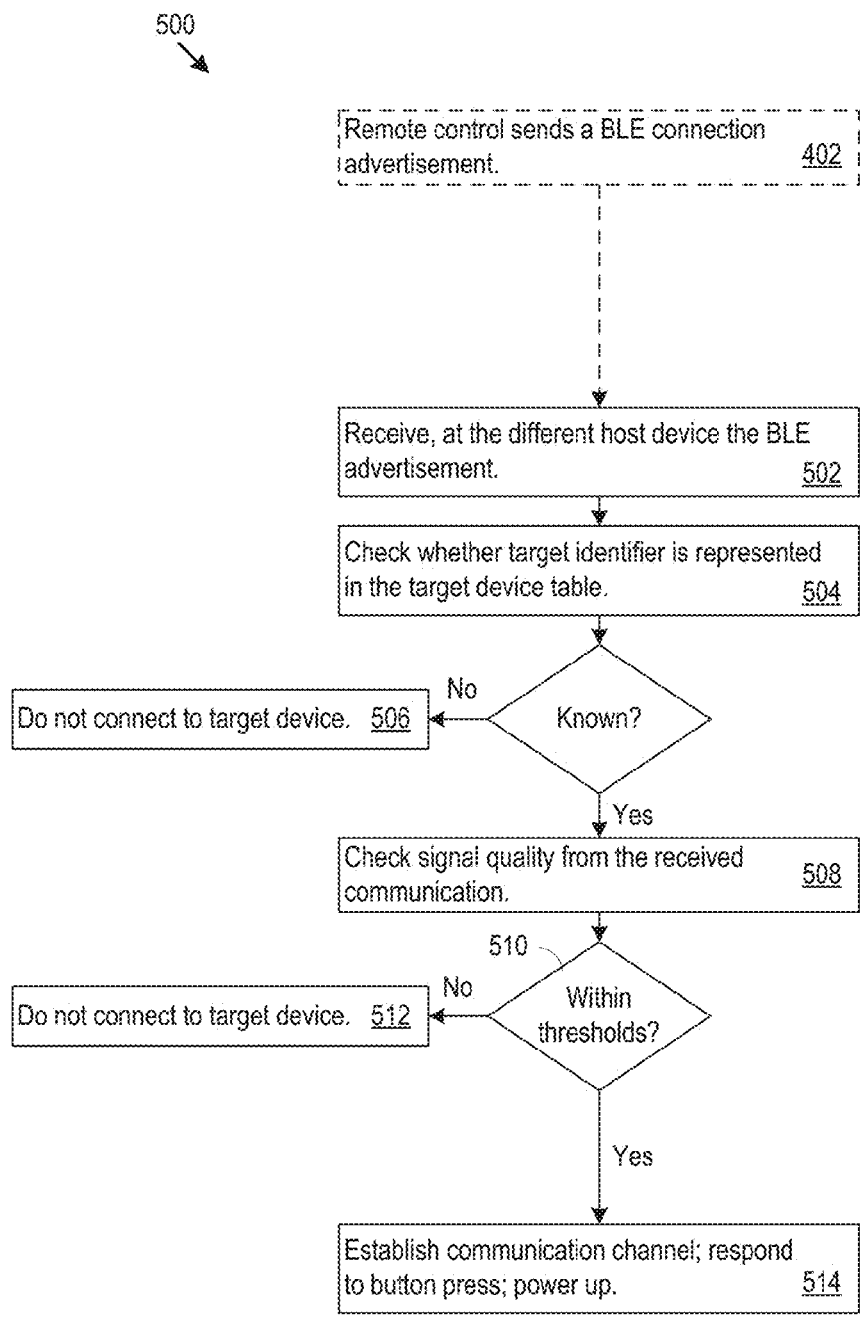
FIG. 5 shows another example of logic for connecting a target device with a host device.

FIG. 5 shows another example of logic 500 for connecting a target device with a host device. FIG. 5 continues the example of FIG. 4, with respect to the actions taken by a different host device (e.g., the living room TV 106) than the one to which the target device was previously connected to (e.g., the bedroom TV 102).

The living room TV 106, although in a different location than the bedroom TV 102, may nevertheless also detect the BLE connected advertisement from the remote control (502). This may occur when the operator has carried the same remote control into the living room, because the remote control transmit power is sufficient to reach both host devices, because the two host devices are close to one another, or for other reasons. The living room TV 106, which is not currently connected to the remote control, checks whether the target device identifier (e.g., the BDADDR) is in the target device table 118 of known target devices (504). If not, the living room TV 106 may ignore the BLE advertisement (506). This check provides a type of security against automatic connection to previously unknown target devices.

Note, however, that the target device identifier may be present in the target device table 118. The identifier may be present, for instance, due to a previous exchange of target device information with the first host device, e.g., with the bedroom TV 102. The living room TV 106 may check the signal quality (e.g., the RSSI) from the received communication (508). The living room TV 106 checks whether the signal quality meets a connection criterion (510). The connection criterion may be, as examples, that the signal level (e.g., RSSI) exceeds a pre-determined threshold, that the signal level falls within a pre-determined range, that the signal level is within a pre-determined range of the last RSSI of a connected remote control, is within a one or more standard deviations based on historical signal level variation, or another criterion.

If the signal quality does not meet the connection criterion, then the living room TV 106 may decide to not connect to the target device (512). However, meeting the connection criterion may be an indication that the remote control is now close to the new host device, e.g., the living room TV 106 and that the operator is trying to use the original remote to power-up and control the living room TV 106. In that case, the living room TV 106 may establish a communication channel with the remote control (e.g., by pairing with the remote control), power-up, and respond to commands issued by the remote control (514). Pairing may be done, for instance, by sending a Sync Train beacon every 80 ms per the 3DG specification, with the sync train including the BDADDR of the living room TV 106 and the clock information for the living room TV 106. The remote control receives the sync train and re-pairs to the living room TV 106, then pages, connects, and controls the living room TV 106.

Figure 6:
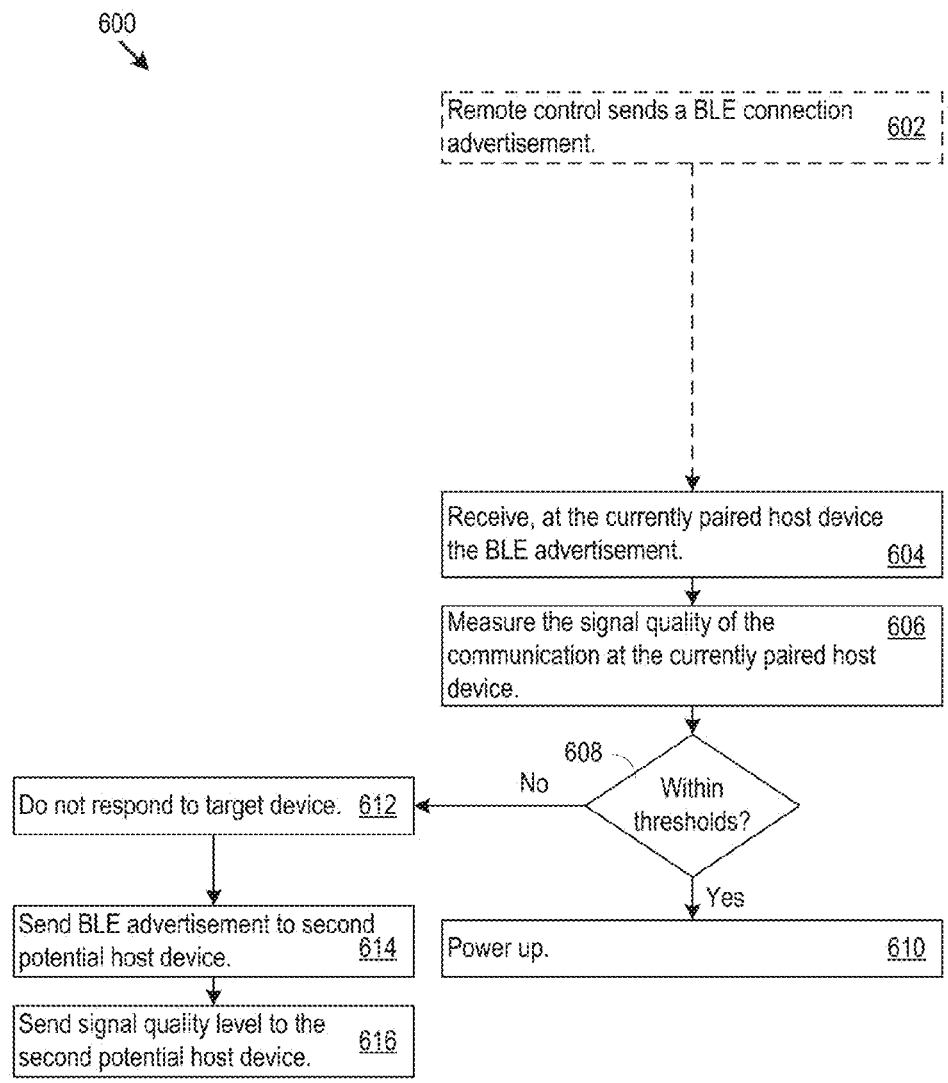
FIG. 6 shows another example of logic for connecting a target device with a host device.
Figure 7:
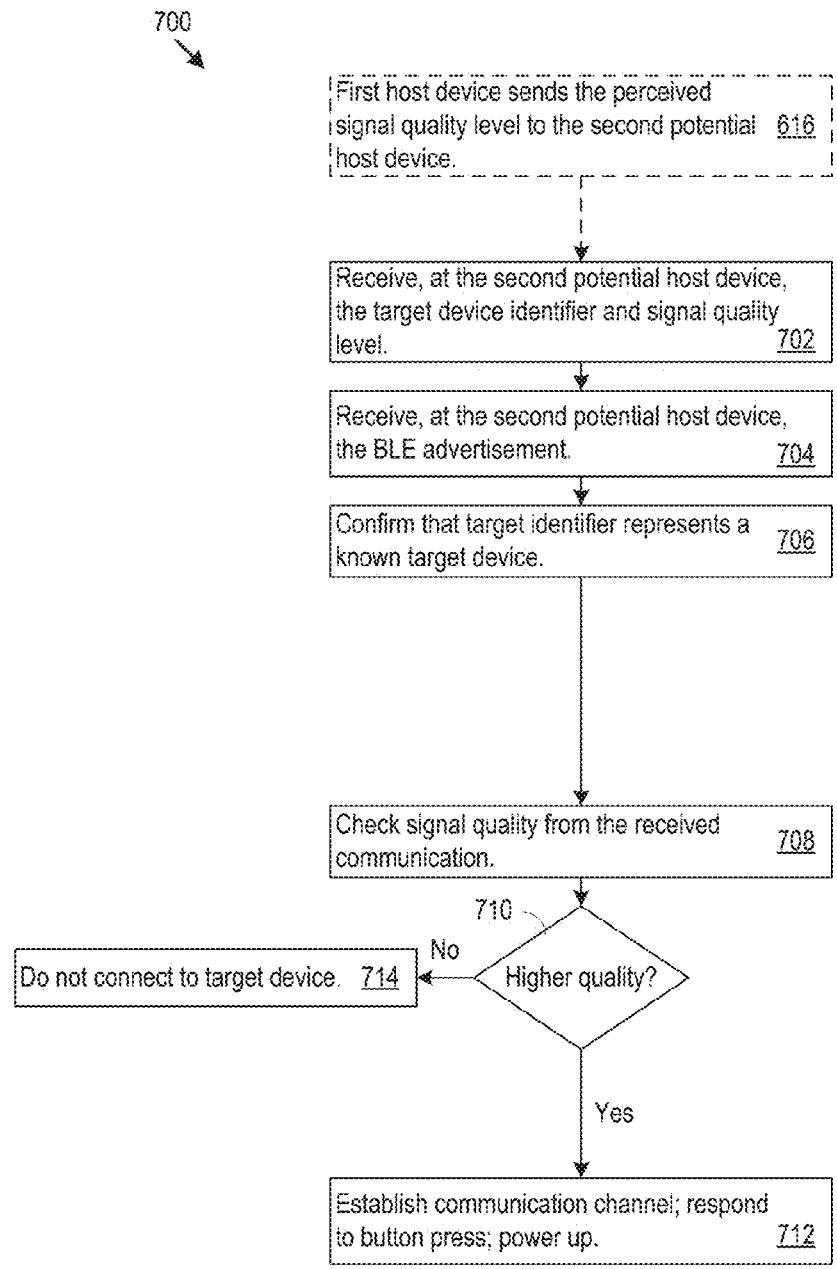
FIG. 7 shows another example of logic for connecting a target device with a host device.

FIGS. 6 and 7 show alternate logic 600 and 700 for connecting a host device to a target device. When the operator activates a specific control or presses a specific button (e.g., the power-on button) on the remote control, the remote control may send a BLE advertisement (602). The host device (e.g., the bedroom TV 102) that the remote control is paired with may receive the BLE advertisement (604) and measure the signal quality of the packet (606).

When the signal quality of the remote control meets a connection criterion, e.g., signal quality above a pre-determined threshold, the originally connected host device, e.g., the bedroom TV 102, may power up in response to the power-on request (610). If the signal quality does not meet the connection criterion, the bedroom TV 102 may disregard the communication from the remote control and not respond (612). In addition, the bedroom TV 102 may send a BLE connected advertisement to a second host device, e.g., to the living room TV 106 or kitchen TV 104 (614). Once connected to the second potential host device for the remote control, the first host device may update the signal quality value perceived by the first host device from the remote control (616), and also provide an identifier of the remote control.

As shown in FIG. 7, the second potential host device may receive the identifier and the signal quality value (702). The second potential host device also receives the original remote control advertisement (704). Having received the identifier of a known remote control (706), the second potential host device need not disregard the BLE advertisement transmitted by the remote control.

Instead, the second potential host device checks the signal quality from the communication received from the remote control (708). The second potential host device may compare the signal quality to that sent from the first host device (710). When the signal quality experienced by the second host device is higher than that of the signal quality received in the update sent by the first host device, the second host device may establish a communication channel with the remote control, e.g., via BT pairing, and the remote control then pages, connects to, and controls the second host device (712). When the second host device experiences lower signal quality, then the second host device may disregard the BLE advertisement from the remote control and not connect to the remote control (714).

In other implementations, when a power button or other trigger button is pressed on a target device, the target device may send a BLE connected advertisement. When a potential host device detects the BLE connected advertisement, the potential host device may initiate a target device information exchange with other host devices. The host devices may exchange detected signal quality levels associated with the target device. The host devices may also compare the exchanged signal quality levels, and the host device with the highest signal quality for that target device (e.g., for a given BDADDR) may respond to the target device. A trigger button press may be any button press on the target device, e.g., on a remote control.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method for auto-pairing comprising:
   receiving at a first host device, from a second host device different than the first host device:
      a target device identifier of a target device previously paired to the second host device;
   adding the target device identifier for the target device to a target device table of known target devices maintained in the first host device;
   detecting a communication signal from the target device; and
   responsive to detecting the communication signal:
      determining current signal quality for the target device with respect to the first host device; and
      determining whether to initiate pairing between the first host device and the target device, based upon:
         the target device being represented in the target device table of known target devices; and
         the current signal quality for the target device with respect to the first host device; and
      when it is determined to initiate pairing, transmitting, to the second host device, an indicator of the current signal quality for the target device with respect to the first host device, and initiate pairing.

2. The method of claim 1, where determining whether to initiate comprises:
   determining to not initiate pairing when the target device is not represented in the target device table of known target devices.

3. The method of claim 1, where determining whether to initiate comprises:
   determining to not initiate pairing when the current signal quality fails to meet a pairing criterion.

4. The method of claim 1, where determining whether to initiate comprises:
   determining to initiate pairing when the target device is represented in the target device table of known target devices and when the current signal quality meets a pairing criterion.

5. The method of claim 4, where the pairing criterion is met when the current signal quality falls within a predetermined range of a previous signal quality level for a different target device that was previously paired with the first host device.

6. The method of claim 1, where pairing comprises Bluetooth(R) pairing.

7. The method of claim 1, where the indicator for the current signal quality comprises:

a received signal strength indicator.

8. The method of claim 1, where the target device comprises:
    a remote control device for the first host device and also for the second host device.

9. The method of claim 1, further comprising:
    transmitting, to the second host device:
        an additional target device identifier for an additional target device previously paired with the first host device; and
        a signal quality indicator for the additional target device, the signal quality indicator indicative of previous signal quality experienced by the first host device when previously paired to the additional target device.

10. An apparatus for auto-pairing comprising:
    communication interface circuitry for a first host system, the communication interface circuitry configured to:
        receive a first target identifier from a first target device that attempts to control the first host system;
        also receive the first target identifier from a second host system previously controlled by the first target device;
    a memory configured to store a known target device list comprising the first target identifier; and
    analysis circuitry in communication with the communication interface and the memory, the analysis circuitry operable to:
        determine whether to allow the first target device to control the first host system by:
            obtaining a first signal strength indicator for the first target device with respect to the first host system;
            determining that the first target device is represented in the target device list; and
            comparing the first signal strength indicator to a connection threshold; and
        when it is determined to initiate pairing, cause the communication interface circuitry to transmit, to the second host system, the first signal strength indicator for the target device with respect to the first host system, and initiate pairing.

11. The apparatus of claim 10, where:
    the connection threshold comprises a second signal strength indicator of a second target device previously in communication with the first host system.

12. The apparatus of claim 10, where determining comprises:
    determining to not allow the first target device to control the first host system when the first signal strength fails to exceed the connection threshold.

13. The apparatus of claim 10, where the analysis circuitry is further configured to:
    determine to establish a communication channel between the first target device and the first host system, when the first signal strength exceeds the connection threshold.

14. The apparatus of claim 13, where the communication channel comprises a Bluetooth(R) communication channel.

15. The apparatus of claim 10, where the first signal strength indicator comprises:
    a received signal strength indicator (RSSI).

16. The apparatus of claim 10, where the first host system comprises an audio/visual system, and where first target device identifier specifies a remote control device for the audio/visual system.

17. An system for auto-pairing comprising:
    communication interface circuitry is configured to:
        establish a communication channel between a first host system and a second host system, different than the first; and
        transmit from the first host system to the second host system:
            a first target identifier of a first target device previously in communication with the first host system; and
            a first signal strength indicator indicative of first signal strength experienced by
            the first host system when previously in communication with the first target device;
        receive at the first host system from the second host system:
            a second target identifier of a second target device previously in communication with the second host system; and
            a second signal strength indicator indicative of second signal strength currently experienced by the second host system with respect to the second target device;
    a memory configured to store:
        a target device list comprising:
            the first target identifier;
            the first signal strength indicator;
            the second target identifier; and
            the second signal strength indicator; and
        a connection threshold relative to the second signal strength indicator;
    analysis circuitry in communication with the communication interface and the memory,
    the analysis circuitry configured to:
        detect a communication signal from the second target device; and
        responsive to the communication signal:
            determine current signal strength for the second target device with respect to the first host system;
            determine that the second target device is represented in the target device list; and
            determine whether to initiate pairing between the first host system and the second target device based on the current signal strength and the connection threshold.

18. The system of claim 17, where:
    the connection threshold comprises a lower limit below the first signal strength, under which the system determines to not initiate pairing between the first host system and the second target device.

19. The system of claim 17, where:
    the communication signal comprises a control signal applicable to the first host system; and
    the second target device comprises a remote control device for the second host system.

20. The method of claim 1, where determining whether to initiate pairing further comprises:
    determining to initiate pairing when the current signal quality falls within a pre-determined range, the pre-determined range determined using a set statistical deviation from a historical average signal strength for paired devices.

* * * * *